MULTIPLEX PULSE COMMUNICATION SYSTEM

Filed Nov. 9, 1944 7 Sheets-Sheet 1

INVENTOR
HAROLD O. PETERSON.
BY H. S. Grover
ATTORNEY

INVENTOR
HAROLD O. PETERSON.
BY H. S. Grover
ATTORNEY

MULTIPLEX PULSE COMMUNICATION SYSTEM

Filed Nov. 9, 1944 7 Sheets-Sheet 3

INVENTOR
HAROLD O. PETERSON.
BY H. S. Grover
ATTORNEY

May 23, 1950 H. O. PETERSON 2,508,620

MULTIPLEX PULSE COMMUNICATION SYSTEM

Filed Nov. 9, 1944 7 Sheets-Sheet 4

INVENTOR
HAROLD O. PETERSON.
BY H. S. Grover
ATTORNEY

May 23, 1950 H. O. PETERSON 2,508,620

MULTIPLEX PULSE COMMUNICATION SYSTEM

Filed Nov. 9, 1944 7 Sheets-Sheet 5

INVENTOR
HAROLD O. PETERSON.
BY H. S. Grover
ATTORNEY

May 23, 1950 H. O. PETERSON 2,508,620

MULTIPLEX PULSE COMMUNICATION SYSTEM

Filed Nov. 9, 1944 7 Sheets-Sheet 6

INVENTOR
HAROLD O. PETERSON.
BY H. S. Grover
ATTORNEY

May 23, 1950 H. O. PETERSON 2,508,620

MULTIPLEX PULSE COMMUNICATION SYSTEM

Filed Nov. 9, 1944 7 Sheets-Sheet 7

INVENTOR
HAROLD O. PETERSON.
BY H. S. Brown
ATTORNEY

Patented May 23, 1950 2,508,620

UNITED STATES PATENT OFFICE 2,508,620

MULTIPLEX PULSE COMMUNICATION SYSTEM

Harold O. Peterson, Riverhead, N. Y., assignor to Radio Corporation of America, a corporation of Delaware Application November 9, 1944, Serial No. 562,618

10 Claims. (Cl. 250—9)

Figure 1:
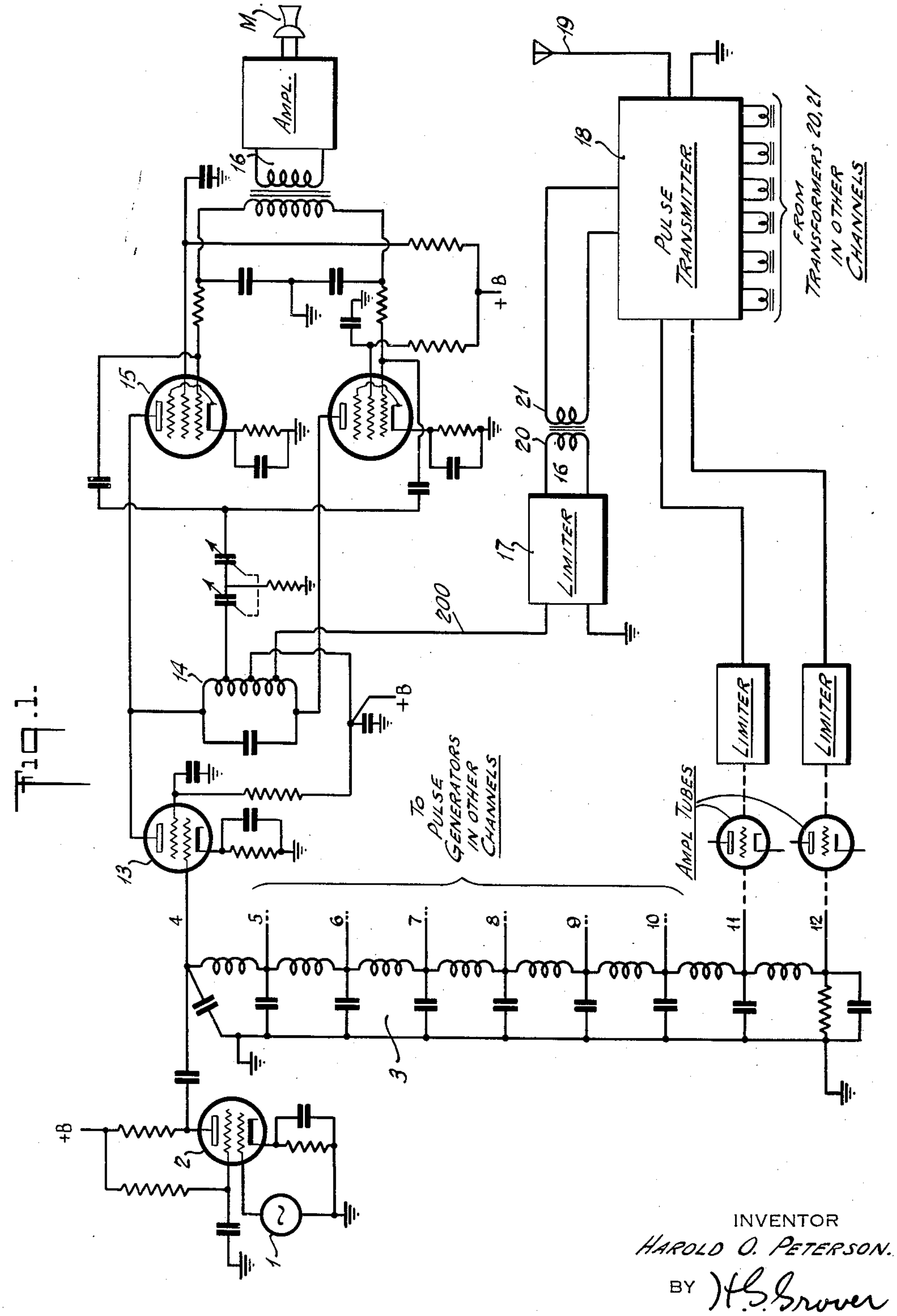

The present invention comprises a multiplex type of pulse communication system having means for synchronous commutation of the various channels so that each channel successively controls the transmission of energy from a transmitter to a receiver.

For a given channel, the number of pulses transmitted per second must be greater than the highest signaling frequency. Thus, for transmission of telephone signal frequencies up to about 3000 cycles, it would be desirable to transmit at least about 10,000 pulses every second for each channel. Hence, if seven telephone transmitting channels are to be employed, it would be required to transmit at least 70,000 pulses per second. The space between the pulses of one channel would be divided into time intervals, each one of which would be used by one of the signalling channels. It is also desirable to transmit a synchronizing signal whereby the commutation means at the receiver can be kept in step with the channel sequence at the transmitter. This synchronizing signal would, of course, be in addition to the intelligence transmitting pulses in the various channels.

In the embodiment of the invention herein described, the pulses in each channel of the transmitting system are modulated in phase by the signal. The pulses therefore can be made quite short compared to the time intervals between them, and they can be of constant width and amplitude, which are conditions favorable to efficient operation with certain types of transmitters. The time duration of the transmitted pulses will depend upon the number of channels employed and the number of pulses for each channel. Thus, if there are seven channels each transmitting 10,000 pulses per second, and there are also transmitted synchronizing pulses, the pulses may each have a duration of one microsecond, for example, and be phase modulated plus and minus 18°, so that the pulses in each channel may vary in phase over a range of 36° at the channel frequency of 10,000 pulses per second. The timing of the pulses in the different channels at the transmitter is so arranged that a pulse is transmitted when an alternating current wave passes through zero amplitude in one direction. An artificial line at the transmitter common to all of the channels fixes the phase of the pulse in each channel relative to the pulses in the other channels for each cycle of operation or frame. At the receiver, the received pulses of variable phase are converted to variable width pulses which are then utilized in an integrating device. An artificial line is also used at the receiver similar to the one at the transmitter for fixing the phase of the pulses in the different receiving channels.

Figure 5A:
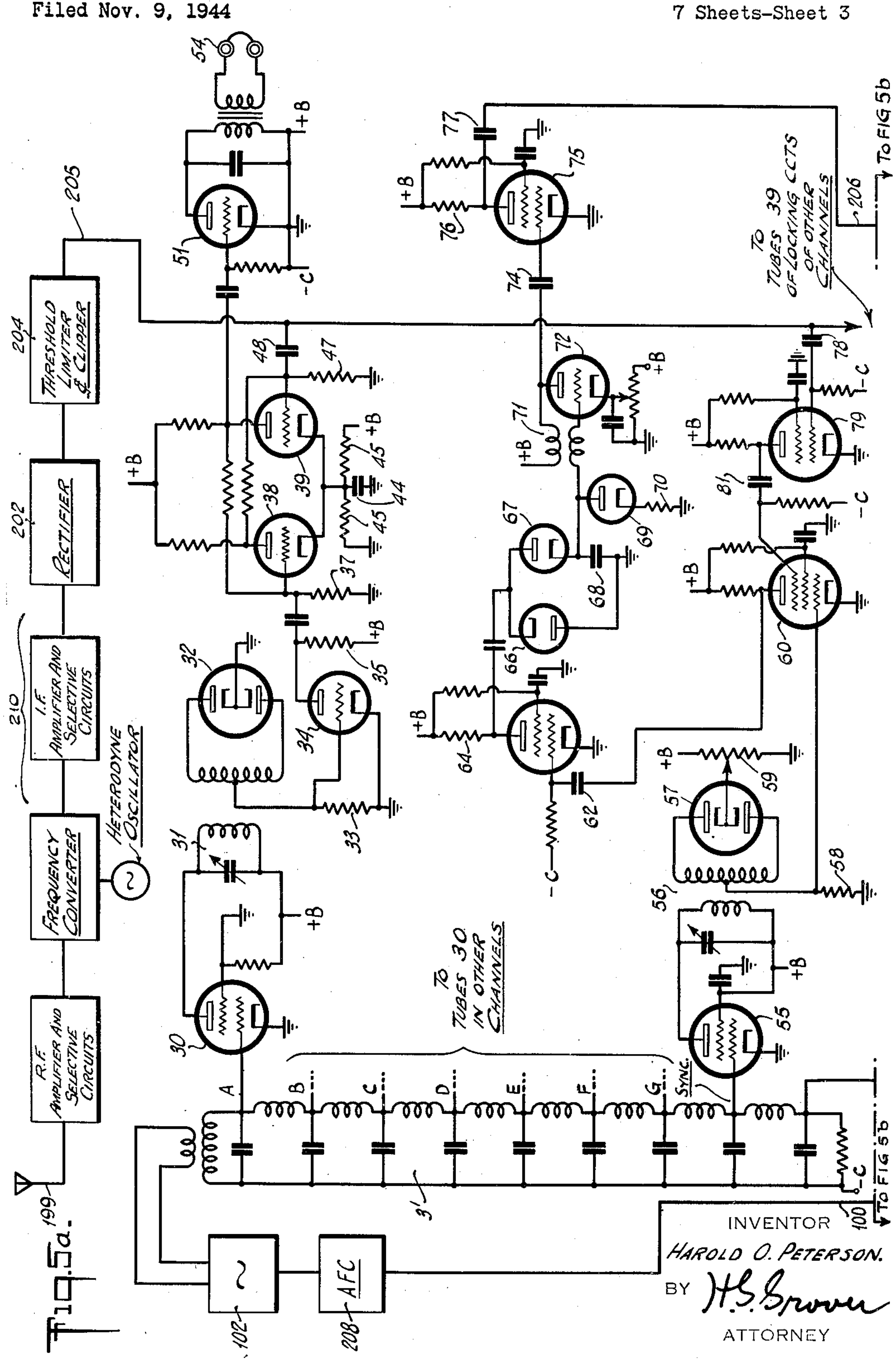
Figure 5B:
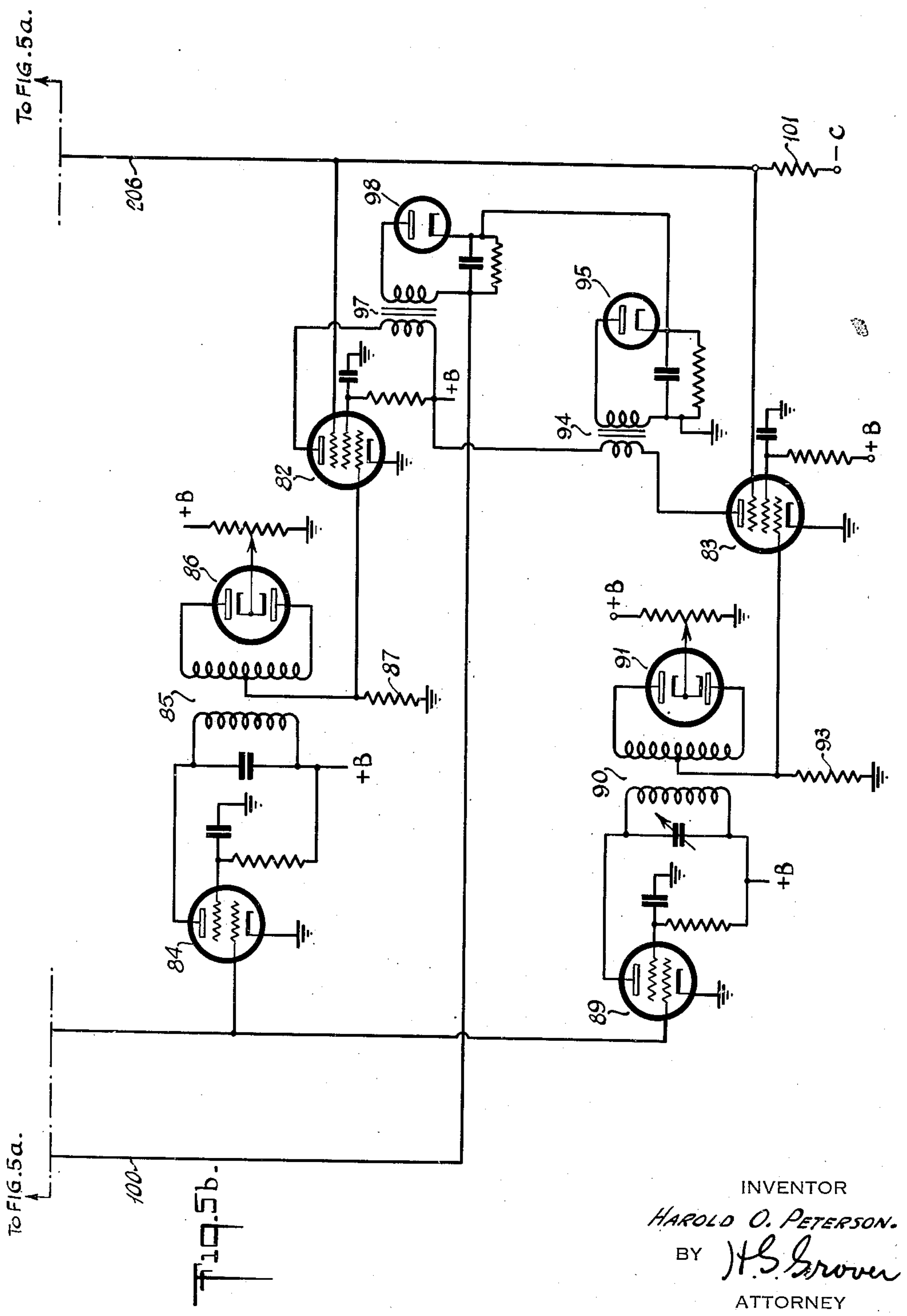
Figures 6A, 6B, 6C, 6D, 6E, 6F:
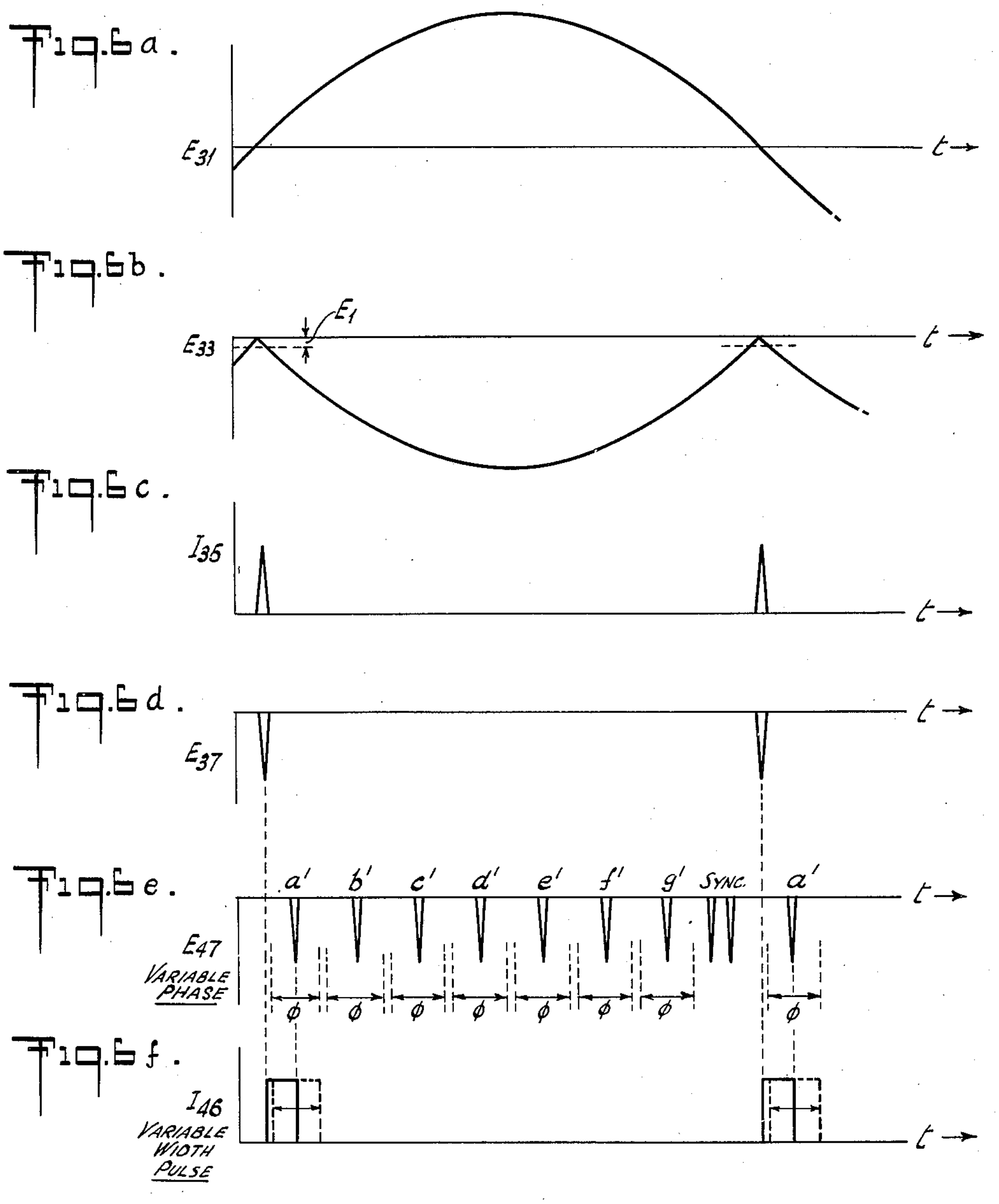
Figures 7A, 7B, 7C, 7D, 7E, 7F:
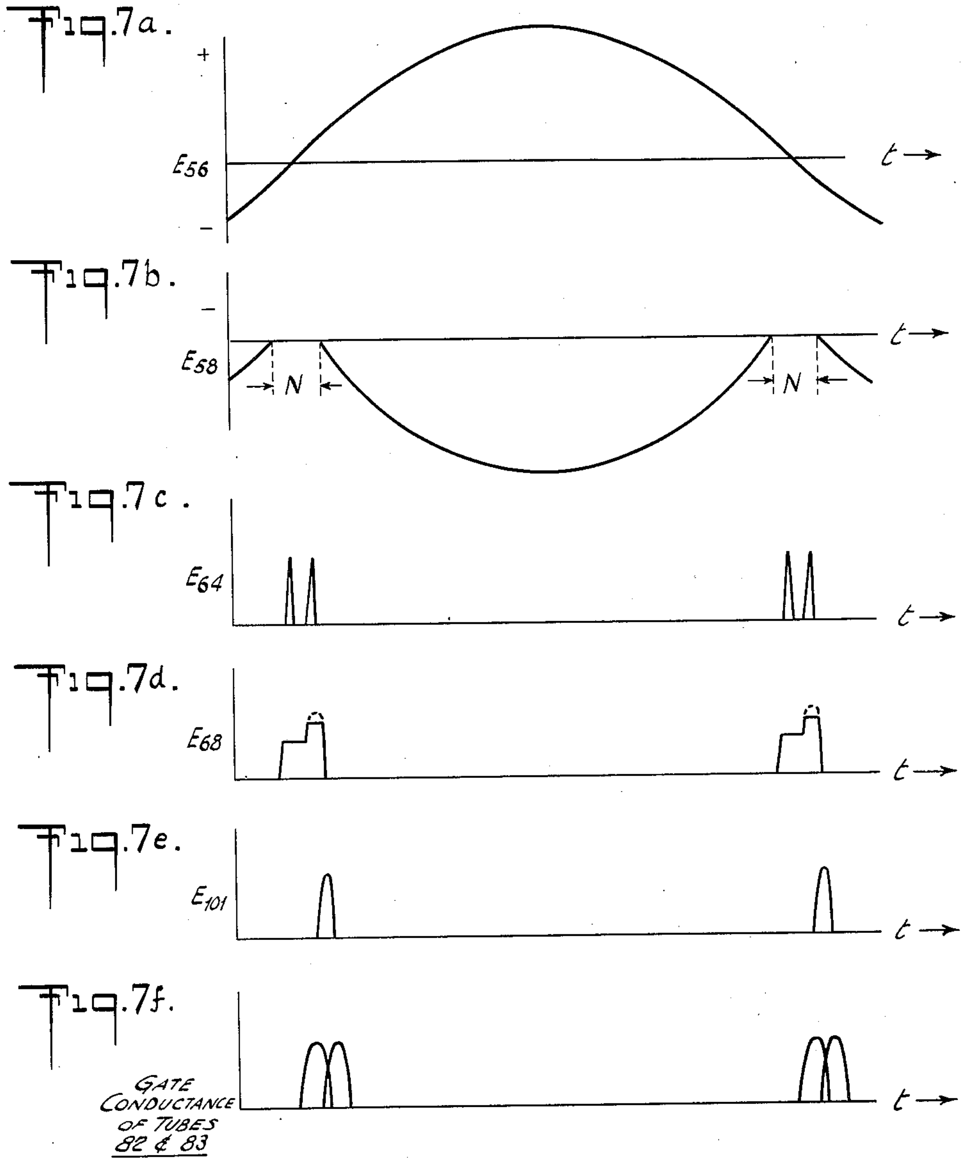
Figure 8:
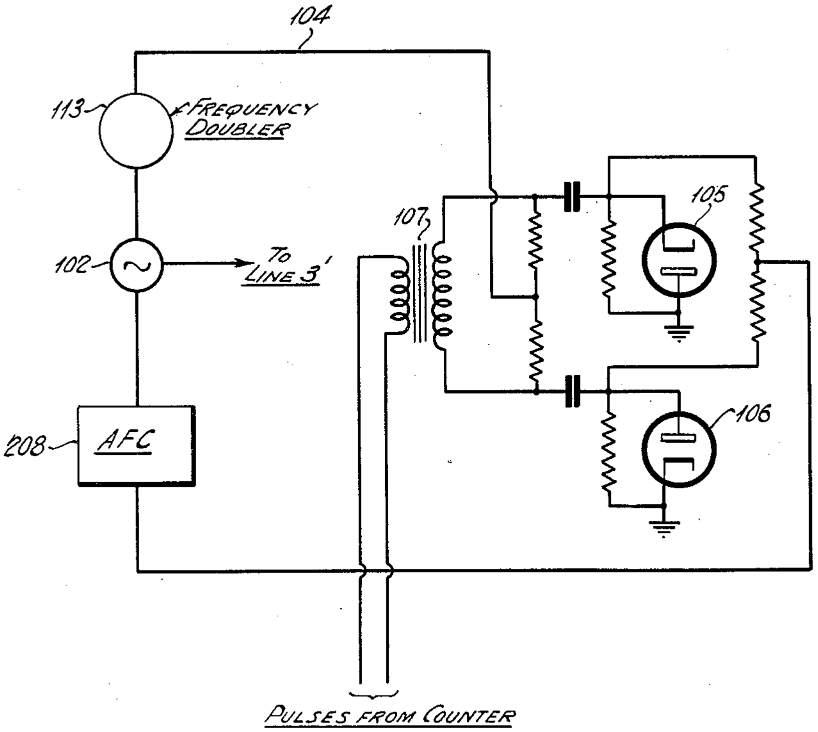

A more detailed description of the invention follows in conjunction with the drawing, wherein:

Fig. 1 illustrates the transmitting system with one of the channels shown in detail;

Figs. 2*a*, 2*b*, 2*c*, 3 and 4 are graphs which explain the operation of the transmitter;

Figs. 5*a* and 5*b*, taken together, illustrate the receiving system with one channel and the synchronizing means shown in detail;

Figs. 6*a* to 6*f* and Figs. 7*a* to 7*f* are graphs which explain the operation of the receiving system; and Fig. 8 illustrates an alternative detail which may be used in the receiver synchronizing system.

Referring to Fig. 1, there is shown a pulse type of multiplex transmitting system with one of the channels shown in detail. Except for the use of generator 1, vacuum tube 2, artificial line 3, radio pulse transmitter 18 and its output antenna 19, which are common to all of the channels, similar equipment appears in each of the channels. Generator 1 is a source of periodically recurring waves; for example, sine waves which are generated preferably at a very constant frequency. The sinusoidal output of the sine wave generator 1 is amplified in screen grid vacuum tube amplifier 2 and then impressed on multi-section artificial line 3 at terminal 4. If the pulse frequency of each channel is chosen to be 10,000 pulses per second, then generator 1 would have a frequency of 10,000 cycles per second. Artificial line 3 consists of a plurality of series and shunt elements. Each section of this artificial line introduces phase delay so that the phase of the alternating current wave at terminal 5 is delayed with respect to the phase of the alternating current wave at terminal 4. Likewise, alternating current waves at terminals 6, 7, 8, 9, 10, 11 and 12 are successively more delayed in phase. The amount of this delay of each section can be definitely determined by the electrical constants of the series and shunt elements of the line 3. Other well known circuit means than the line 3 are available for producing fixed amounts of phase delay; for example there can be employed a number of phase rotators fed in parallel, whose adjustments are set to give a different output phase from each.

Figure 2A:
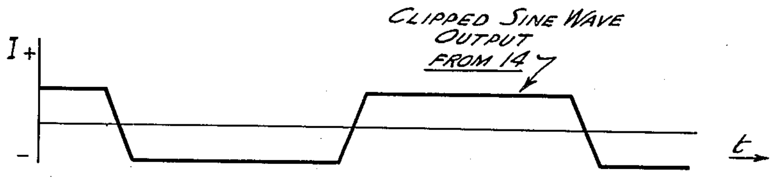
Figure 2B:
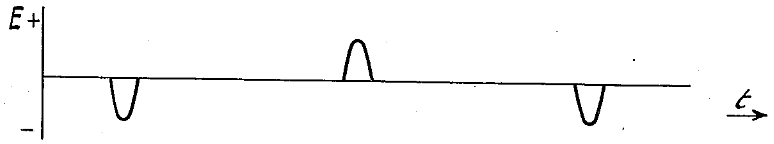
Figure 2C:
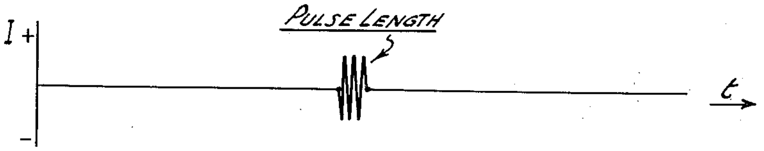

In Fig. 1 the alternating current wave appearing at terminal 4 is amplified in a vacuum tube 13 and appears in tuned circuit 14. The phase of the alternating current voltage of tuned circuit 14 is modulated by means of a pair of push-pull connected reactance vacuum tubes 15 whose grids are coupled to an amplifier 16, in turn coupled to a microphone M upon which the speech waves are impressed. For a more detailed description of the operation of the push-pull reactance tubes 15, reference is made to Usselman Patent 2,342,708 (Fig. 2 thereof particularly), granted February 29, 1944. The terminals 5 to 10, inclusive, shown on artificial line 3 are each connected to other vacuum tubes 13 whose outputs are treated in the same manner as the channel associated with lead 4 and shown in detail in Fig. 1. The sine wave output of tuned circuit 14 is passed by lead 200 to a limiter 17 where it is converted into a clipped wave form, such as shown in Fig. 2*a*. The current of the wave form of Fig. 2*a* is passed through a transformer primary 20 which results in a secondary voltage in winding 21 having a shape such as shown in Fig. 2*b*. The pulse transmitter 18 is so arranged that the negative voltage pulses shown in Fig. 2*b* have no effect on the transmitter output. The transmitter output from apparatus 18 is fed into antenna 19 and is represented in Fig. 2*c* which shows a pulse of radio frequency energy. Pulse transmitter 18 can be any kind of pulse transmitter which is controlled by an incoming pulse of suitable polarity and which is normally not sending but is made to send radio frequency energy upon receipt of an incoming pulse. This transmitter can include a flip-flop or a multivibrator type of circuit.

Circuits from the transformers 20, 21 of the other channels of the multiplex system are also introduced into the pulse transmitter 18, as shown, so that a short pulse of radio frequency energy is transmitted each time transmitter 18 receives a short pulse of positive (unidirectional) voltage from any channel. Thus, the voltage appearing at terminals 5, 6, 7, 8, 9 and 10, representative of the alternating current waves from the other channels, may likewise be converted into phase modulated pulses for each of which the transmitter 18 will radiate a short pulse of radio frequency energy. The voltages at terminals 11 and 12 on the artificial line 3 are used to transmit two unmodulated pulses which are spaced close together and which are to be used at the receiver for synchronizing the commutation of the receiver. Terminals 5 to 10, inclusive, on artificial line 3 are connected to different channels each of which includes a tube 13, apparatus 14, 15, 16, 17, 20, 21, and a microphone M. Terminals 11 and 12 on line 3 are separately connected to the pulse transmitter 18 through separate paths each of which includes only an amplifier tube and a limiter.

Figures 3, 4:
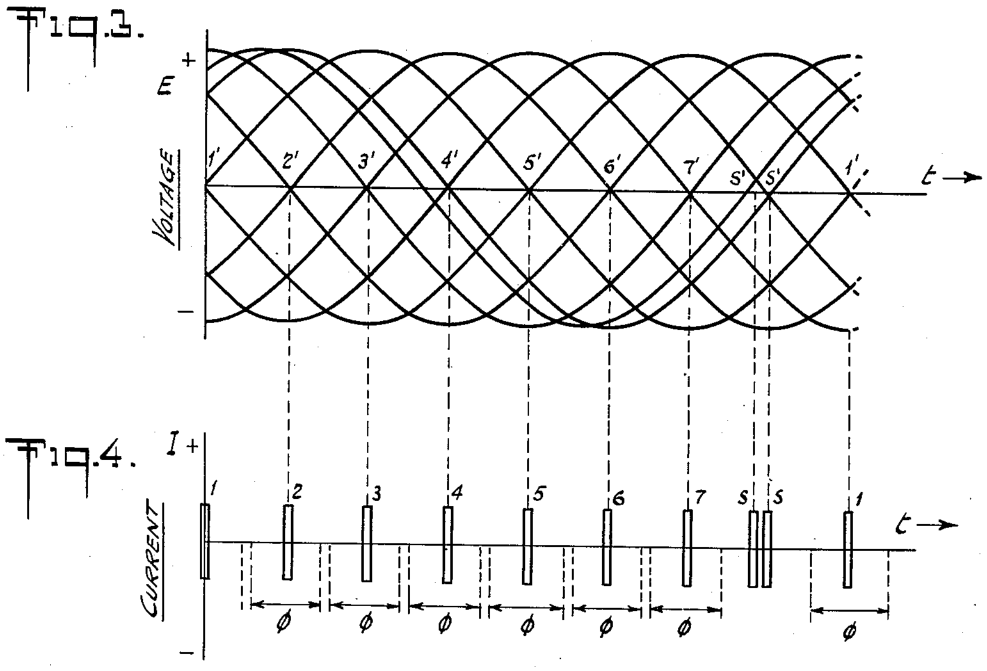

Fig. 3 illustrates the phases of the voltages on terminals 4 to 12, inclusive. These are used to control the timing of the radio frequency pulses in the manner illustrated in Fig. 4. In Fig. 4, pulses 1 to 7, inclusive, may each have their phases modulated by the signal over the range illustrated as $\phi$. The two pulses S, S which are shown closely spaced are the synchronizing pulses above mentioned. It should be noted that pulses 1 to 7, inclusive, and the synchronizing pulses S, S occur at the time the alternating current waves of Fig. 3 (which are similarly labeled except for the prime designations) pass in one direction through zero amplitude. Thus, in the system as here shown, each cycle of the pulse frequency oscillator 1 causes nine short pulses to be radiated by the pulse transmitter 18. Seven of these are used for signaling and two for synchronizing purposes. If the frequency of oscillator 1 is 10,000 cycles per second, it will be evident that there are therefore transmitted 90,000 pulses per second from the multiplex transmitter. Each of the pulses 1 to 7, inclusive, in Fig. 4 will serve to transmit an independent message over a signaling channel. As described above, these pulses may each have a duration of one microsecond and be phase modulated plus and minus 18° so that the pulses in each channel may vary in phase over a range of 36° at the channel frequency of 10,000 pulses per second.

Fig. 5*a* represents one embodiment of a receiving system for use with the multiplex transmitter of Fig. 1. The radio frequency signal is received on a more or less conventional superheterodyne radio receiver 210 having a receiving antenna 199, as shown. In this receiver, the signal which is rectified at 202 appears as a direct current pulse which may be passed through a threshold limiter-clipper 204 which operates to eliminate any noise between pulses, which noise lies below a predetermined value. This limiter-clipper device also prevents the output pulses from exceeding a predetermined value. This device can serve to eliminate from the signal all amplitude variation due to noise if the peak pulse amplitude exceeds the peak noise amplitude by at least 6 db. Such a clipper is sometimes referred to as a top and bottom limiter because it removes noise and variations above and below certain limits. A local oscillator 102 of periodically recurring waves, for example sine waves, serves to time the reception of the various channels. The phasing of the control wave for the various channels is determined by an artificial line 3′ in the same manner as described for the transmitter of Fig. 1. Line 3′ is similar to line 3 at the transmitter part of the system. Assuming that the pulse frequency of a generator is 10,000 pulses per second, oscillator 102 is made to have a frequency of 5,000 cycles per second. The reason for making the oscillator frequency one-half of the oscillation frequency will appear later.

The alternating current wave from the oscillator 102 is amplified in vacuum tube 30 and its output appearing in transformer 31 is represented by Fig. 6*a*. When this is rectified by the full wave rectifier 32, there is obtained in the load resistance 33 a wave having the shape shown in Fig. 6*b*. The flow of current through resistance 33 develops a voltage which biases the tube 34 to cut-off. It will be noted that this wave of Fig. 6*b* approaches zero voltage two times for each cycle of the alternating current wave generator 102. $E_1$ in Fig. 6*b* represents the threshold or cut-off value for tube 34. This pulse of current results in a negative pulse of voltage across resistor 35, as shown in Fig. 6*d*, and this negative pulse is transmitted to the grid of vacuum tube 38 which causes the tube 38 to stop drawing plate current. The current pulse through resistor 35 is represented in Fig. 6*c*.

Tubes 38 and 39 together with their associated circuit elements operate in a well known manner. This circuit detail is sometimes referred to as the Finch locking circuit and is described in more detail in United States Patent No. 1,844,950, granted to J. L. Finch February 16, 1932. Locking circuit 38, 39 consists essentially of two vacuum tubes which have their plates and grids resistively interconnected in such manner that the apparatus has two degrees of electrical stability.

These devices are unstable when both are drawing current but stable when one tube is drawing current and the other tube blocked or prevented from passing current. The change from one condition of stable equilibrium, such as when device 38 is blocked and device 39 passing, to the other condition when device 39 is blocked and device 38 is passing, is caused by the presence of a suitable predetermined potential on the grids. Tube 39 continues to draw plate current until a negative limited and clipped pulse is received from the radio receiver 210 through lead 205 and coupling condenser 48, at which time tube 39 ceases to draw current and tube 38 commences drawing current. Succeeding negative pulses from the receiver 210 have no effect on the circuit as long as tube 39 is already blocked or cut-off.

By reference to Fig. 6*f*, it will be noted that the length of time during which tube 39 draws current will depend upon the time interval between the locally generated pulses from tube 34 (illustrated by the voltage pulse E37 in Fig. 6*d*) and a next following negative pulse *a'* from the receiver obtained over lead 205. Note Fig. 6*e*. The pulses *a'* to *g'* shown in Fig 6*e* represent the seven pulses consecutively received from the seven channels. These pulses *a'* to *g'* in lead 205 build up a voltage across resistor 47 as represented by E47 in Fig. 6*e*. The angle $\phi$ in Fig. 6*e* represents the range over which the pulses in the incoming channels may be modulated. It should be noted that the locking circuit 38, 39 has converted the variable phase input pulse from the receiver to a variable width output pulse (Fig. 6*f*) which is used in integrating tube 51 and thence monitored in headphones 54.

Referring to Fig. 7*a*, there is shown the voltage wave derived from artificial line 3' amplified in vacuum tube 55 and appearing in transformer 56. This voltage wave of Fig. 7*a* is rectified in the full wave rectifier 57. In this case a direct current bias is introduced by potentiometer 59 in such a manner that the rectifier 57 does not draw current until the alternating current value exceeds a preset level determined by the setting of 59. This results in a time interval N shown in Fig. 7*b*, during which no current flows in resistor 58 in the rectifier circuit. During this time interval in which no current flows in resistor 58, vacuum tube 60 is made to conduct current, providing the #3 grid of tube 60 is also properly biased. The direct current bias of the #3 grid of tube 60 is set to such a value by bias potential source —C that no plate current flows in tube 60 except when a positive pulse is received through coupling condenser 81. This positive pulse may be produced by the negative receiver signal pulses introduced at the grid of tube 79 through coupling condenser 78 from lead 205. It is produced by virtue of the negative pulse on lead 205 reducing the flow of current in tube 79 and causing the anode voltage on this tube 79 to rise. Thus, it will be seen that vacuum tube 60 transmits nothing except during times when there is zero bias on the #1 grid (when rectifier 57 is non-conducting) and a positive pulse on the #3 grid. Tube 60 may therefore be referred to as a "gate" or "gating" tube, sometimes referred to as a "shutter." This gating tube 60 supplies negative pulses to tube 62. When the phase of the oscillator 102 is approximately correct, the voltage on the #1 grid of tube 60 will be zero at such time that both of the closely spaced synchronizing pulses received by the apparatus will be effective in causing two closely spaced positive pulses represented by Fig. 7*c* to appear on the grid on the following tube 62.

This tube 62 and its associated elements constitute a counting circuit timer. In this counting circuit timer, each positive pulse adds an increment of voltage appearing across condenser 68. The legend "E68" (Fig. 7*d*) illustrates how the two positive pulses from E64 add to produce a resultant triggering voltage on condenser 68. When this voltage exceeds a preset value, a blocking oscillator 71, 72 generates a pulse and at the same time discharges condenser 68. A slow discharge circuit 69, 70 has been added to dissipate charges which are spaced at intervals considerably greater than the interval between the two synchronizing pulses. Thus, two closely spaced pulses introduced in the counter circuit produce a single pulse in the plate circuit of tube 75 (lead 206), which may be represented by the showing of Fig. 7*e*. Fig. 7*e* shows the voltage built up across the resistor 101 (Fig. 5*b*). It will be seen that the counter circuit is essentially an integrating device or frequency divider wherein an accumulating charge on the condenser 68 eventually achieves a critical voltage that initiates a discharge cycle which discharges the condenser preparatory to the next integrating or countercycle. In the manner similar to that above described for tube 60, two other tubes 82 and 83 are caused to serve as "gates" or shutters" for the pulse transmitted over lead 206 by the counter circuit timer. These two gates are phased to operate at slightly different times, as illustrated in Fig. 7*f*. If the pulse from the counter circuit timer occurs at exactly the correct time, it will occur equally in the two "gating" tube outputs which feed through transformers 94 and 97 into rectifiers 95 and 98 which have their load circuits at series opposition. Hence, when the pulse from the counter circuit timer appears equally at the two gating tubes 82 and 83, there will be zero voltage applied through connection 100 to the AFC circuit 208 controlling the frequency of oscillator 102. However, if the pulse shown in Fig. 7*e* is slightly displaced, it will appear more in one gate 82 or 83 than in the other gate 83 or 82, and therefore result in a direct current voltage being applied to the AFC circuit 208 in such manner as to make the proper adjustment of the frequency of the oscillator 102. The AFC circuit 208 may be a motor which is controlled by the voltage in lead 100 and whose rotatable armature is linked to variable condenser in oscillator 102.

The slight phase displacement necessary in the timing of "gates" 60, 82 and 83 may be adjusted by means of the tuning condensers in shunt with the primaries of transformers 56, 85 and 90. The voltage fed to the rectifiers 86, 91 are those made to differ slightly in phase to achieve the results shown in Fig. 7*f*.

Fig. 8 shows another detail circuit whereby the pulse from the counter circuit timer may be combined with the total frequency voltage derived from oscillator 102 through a frequency doubler 103 in such manner as to produce a synchronizing control voltage for the AFC circuit 208.

It should be noted that the output of the frequency doubler is supplied via lead 104 in push-push to the diodes 105 and 106, whereas the pulses from the counter are supplied via transformer 107 to the same device in push-pull. For a more detailed description of the diode circuit arrangement of Fig. 8, reference is made to the television receiver synchronizing circuit described by Wendt and Fredendall in the Proceedings of the IRE for January, 1943, pages 7–15, inclusive.

What is claimed is:

1. A pulse type multiplex communication system comprising an antenna system and a plurality of channels coupled to said antenna system, an artificial line having a plurality of electrical sections in series, a source of alternating current waves coupled to said line, connections from said channels to different sections on said line, whereby said line supplies said channels with the waves from said source at relatively different phases, each of said channels including apparatus for producing pulses of energy from said waves, the pulse duration of which is short compared to the time interval between them, said apparatus in each channel including a tuned circuit producing a sinusoidal output wave and a limiter coupled to said tuned circuit, and push-pull connected reactance tube apparatus in each channel coupled to the tuned circuit in that channel for modulating the timing of the pulses produced in that channel.

2. In a radio communication system, a plurality of transmitting channels each having modulation equipment, a common source of periodically recurring constant frequency sine waves for all of said channels, a transmission line circuit coupled to said source and having connections from different points located progressively along said line to different transmitting channels, to thereby supply said channels with said waves at different phases, means in each channel for converting said waves to constant width pulses which are short compared to the time intervals between them, said means including a tuned circuit for producing a sine wave output, a limiter coupled to said tuned circuit, and a pulse transformer coupled to the output of said limiter; and a pulse radio transmitter coupled to the outputs of said channels and controlled by the pulses produced in said channels.

3. The method of multi-channel communication which includes the steps of supplying the different channels with alternating current voltage waves of the same frequency but of different relative phases, modulating the phase of said alternating current waves in said channels independently of one another in accordance with different signals, separately limiting the modulated alternating current waves in said channels, and producing from said waves in said channels pulses of energy when said waves pass in only one direction through zero amplitude.

4. A pulse type multiplex communication system comprising transmitting apparatus and a plurality of intelligence carrying channels and a synchronizing circuit coupled at one end to said apparatus, a transmission line having a plurality of series connected sections, a source of periodically recurring constant frequency waves coupled to a point on said multi-section transmission line, connections from the other ends of said channels and from the other end of said synchronizing circuit to different sections on said line progressively removed from said point, whereby the phases of the recurring waves supplied to said channels are different, means in each intelligence carrying channel for producing pulses of energy from said waves and for modulating the timing of said pulses within predetermined limits, and means in said synchronizing circuit for producing a pulse of energy from said waves, a remotely located receiving system including a plurality of channels corresponding in number to the channels at the location of the transmitter and also a synchronizing circuit, said receiving system including a multi-section transmission line similar to the line at the transmitter and a source of periodically recurring waves of a frequency equal to half the pulse repetition rate for each transmitter channel coupled to said line at the receiver, and connections from the receiver channels and from said synchronizing circuit to different sections of said last line to thereby receive from said line recurring waves with relatively different phases, means for supplying the receiver channels and said synchronizing circuit with the pulses received by said receiving system, and an automatic frequency control circuit coupled between said source of periodically recurring waves at said receiving system and said last synchronizing circuit.

5. The method of multiplex transmission which includes generating a number of time displaced sinusoidal waves of like frequency, phase modulating each sinusoidal wave with a different signal, generating a high frequency carrier, deriving unidirectional current pulses of like polarity from each of the phase modulated waves, and modulating the carrier with said derived pulses.

6. The method of multi-channel communication which includes the steps of supplying the different channels with alternating current voltage waves of the same frequency but which are displaced in time, modulating the instantaneous frequency of said alternating current waves in said channels independently of one another in accordance with different signals, producing pulses of undirectional current in said channels from said modulated waves, and utilizing only pulses of predetermined polarity in said channels to produce pulses of radio frequency energy.

7. A pulse type multiplex communication system comprising transmitting apparatus and a plurality of intelligence carrying channels and a plurality of synchronizing circuits coupled at one end to said apparatus, a source of periodically recurring constant frequency waves coupled to a transmission line having a plurality of serially arranged sections, connections from the other ends of said channels and from the other ends of said synchronizing circuits to different sections on said line, whereby the phases of the recurring waves supplied to said channels and to said synchronizing circuits are different, the time delay between adjacent sections connected to said channels being longer than the time delay between sections connected to said synchronizing circuits for a wave traveling over said line, means in each channel for producing pulses of energy from said waves and for modulating the timing of said pulses within predetermined limits, means in each synchronizing circuit for producing a pulse of energy, a remotely located receiving system including a plurality of channels corresponding in number to the channels at the location of the transmitter, said receiving system including a multi-section transmission line similar to the line at the transmitter, a source of periodically recurring constant frequency waves coupled to said line at the receiver, and connections from the receiver channels to different sections of said last line, to thereby receive from said line recurring waves with relatively different phases, only a single synchronizing circuit at said receiver coupled to a different section on said line than those sections to which the receiver channels are coupled, and means for supplying the receiver channels and the synchronizing circuit with the pulses received by said receiving system.

8. A pulse type multiplex communication system comprising transmitting apparatus and a plurality of intelligence carrying channels and a synchronizing circuit coupled at one end to said apparatus, a transmission line having a plurality of series connected sections, a source of periodically recurring constant frequency waves coupled to a point on said multi-section transmission line, connections from the other ends of said channels and from the other end of said synchronizing circuit to different sections on said line progressively removed from said point, whereby the phases of the recurring waves supplied to said channels are different, means in each intelligence carrying channel for producing pulses of energy from said waves and for modulating the timing of said pulses with predetermined limits, and means in said synchronizing circuit for producing a pulse of energy from said waves, a remotely located receiving system including a plurality of channels corresponding in number to the channels at the location of the transmitter and also a synchronizing circuit, said receiving system including a multisection transmission line similar to the line at the transmitter and a source of periodically recurring waves of a frequency equal to half the pulse repetition rate for each transmitter channel coupled to said line at the receiver, and connections from the receiver channels and from said synchronizing circuit to different sections of said last line to thereby receive from said line recurring waves with relatively different phases, and means for supplying the receiver channels and said synchronizing circuit with the pulses received by said receiving system, said synchronizing circuit at the receiver including means responsive to the phase difference between a wave representative of the received synchronizing pulse and a wave from said transmission line at said receiver for automatically controlling the frequency of the source of recurring waves at the receiver, said last means having a pair of connections to different points on said line at the receiver and another connection to a frequency controlling element for said source of recurring waves at the receiver.

9. A pulse multiplex system comprising a source of recurring waves, means for abstracting from said source a plurality of time displaced sinusoidal waves of like frequency, means for modulating the phases of different ones of said plurality of time displaced sinusoidal waves with different signals, means for deriving unidirectional current pulses of like polarity from the different phase modulated waves, means for generating a high frequency carrier wave, and means for modulating said carrier wave with said derived pulses.

10. The method of multi-channel communication which includes the steps of supplying a pair of different channels with recurring waves of varying amplitude and of the same frequency so phased that when one wave in one channel is passing through zero amplitude the other wave is at maximum amplitude, producing from said waves in said channels pulses of energy when said waves pass through zero amplitude, and modulating said pulses independently of one another.

HAROLD O. PETERSON.

REFERENCES CITED

The following references are of record in the file of this patent:

UNITED STATES PATENTS

| Number | Name | Date |
|---|---|---|
| 1,510,792 | Merritt | Oct. 7, 1924 |
| 1,802,745 | Whitaker | Apr. 28, 1931 |
| 1,979,463 | Goshaw | Nov. 6, 1934 |
| 2,048,081 | Riggs | July 21, 1936 |
| 2,086,918 | Luck | July 13, 1937 |
| 2,113,214 | Luck | Apr. 5, 1938 |
| 2,172,354 | Blumlein | Sept. 12, 1939 |
| 2,199,634 | Koch | May 7, 1940 |
| 2,209,395 | Fitch | July 30, 1940 |
| 2,213,941 | Peterson | Sept. 3, 1940 |
| 2,215,776 | Barnard | Sept. 24, 1940 |
| 2,262,838 | De Loraine et al. | Nov. 18, 1941 |
| 2,352,634 | Hull | July 4, 1944 |
| 2,363,062 | Hartley | Nov. 21, 1944 |
| 2,414,265 | Lawson | Jan. 14, 1947 |
| 2,423,466 | Peterson | July 8, 1947 |
| 2,429,608 | Chatterjea et al. | Oct. 28, 1947 |

FOREIGN PATENTS

| Number | Country | Date |
|---|---|---|
| 118,054 | Australia | Jan. 20, 1944 |